United States Patent
Friedl et al.

(10) Patent No.: US 8,104,904 B2
(45) Date of Patent: Jan. 31, 2012

(54) BAFFLE PLATE FOR A MOVIE OR TV CAMERA

(75) Inventors: Werner Friedl, Markt Schwaben (DE); Juergen Nussbaum, Ottobrunn (DE)

(73) Assignee: Chrosziel GmbH, Kirchheim (DE)

( * ) Notice: Subject to any disclaimer, the term of this patent is extended or adjusted under 35 U.S.C. 154(b) by 332 days.

(21) Appl. No.: 12/380,712

(22) Filed: Mar. 3, 2009

(65) Prior Publication Data
US 2009/0262430 A1    Oct. 22, 2009

(30) Foreign Application Priority Data
Mar. 3, 2008  (DE) .................... 20 2008 002 984 U

(51) Int. Cl.
*G02B 21/00*    (2006.01)
*G02B 23/16*    (2006.01)

(52) U.S. Cl. .................... 359/611; 359/600; 359/511

(58) Field of Classification Search .................. 359/511, 359/600, 611, 896; 396/448, 554
See application file for complete search history.

(56) References Cited

U.S. PATENT DOCUMENTS
4,752,798 A * 6/1988 Chrosziel ................ 396/534
5,708,902 A * 1/1998 Navarro .................. 396/544

FOREIGN PATENT DOCUMENTS
DE            43 12 654 C2    4/1993

\* cited by examiner

*Primary Examiner* — Thong Nguyen
(74) *Attorney, Agent, or Firm* — Park, Vaughan, Fleming & Dowler LLP

(57) ABSTRACT

The baffle plate for a lens of a movie or TV camera has an add-on tube that can be slipped onto the camera lens with little clearance. The add-on tube is provided with a swivel arm, which has a swivelling axis which is fixed with respect to the camera lens and which is located in parallel to the rear plane of the add-on tube and in or behind this plane and is positioned such that the distance to the opposite rear inner edge of the add-on tube which is slipped onto the camera lens is approximately equal to or larger than the distance to the front outer edge of the camera lens. The clearance between the add-on tube and the camera lens is from 0.5 mm to 1 mm.

4 Claims, 1 Drawing Sheet

BAFFLE PLATE FOR A MOVIE OR TV CAMERA

BACKGROUND OF THE INVENTION

The invention relates to a matte box, i.e. an adjustable baffle plate for a lens of a movie or TV camera. The baffle plate comprises a light gate which essentially only lets the light required for the taking of pictures strike into the camera lens and keeps away undesired stray light or extraneous light from the camera lens. The light gate has a rear add-on tube in the form of a ring, which can be slipped onto the tube of the camera lens with little clearance and supports the light gate and faces the camera, into which the tube of the camera lens immerses up to a specific immersion depth. The rear edge of the add-on tube, which faces the camera is substantially in one plane, the immersion depth of the tube of the camera lens is in the range of from 0 to 20 mm, in particular 10 to 20 mm, into this add-on tube.

Such baffle plates are e.g. known from DE 43 12 654.

Often, baffle plates additionally have devices for receiving plane glass filters. It is important in the case of the taking of movie and TV pictures that light reflections that influence the taking of the pictures are prevented to the greatest possible extent, namely also such light reflections from light sources that are situated behind the camera. For this purpose it is indispensable that the distance, i.e. the clearance between the add-on tube of the baffle plate and the tube of the camera lens is only relatively small and the immersion depth of the camera lens into the add-on tube is relatively large. In known solutions the clearance is, as a rule, in the range of from 0.5 to 1 mm, e.g. 0.75 mm, and the immersion depth is approx. 14 mm.

In addition, it must be possible to laterally swing away modern professional baffle plates, for instance for exchanging the lens. Consequently, all so-called swing-away systems known so far have a device which, initially, moves the baffle plate forward with respect to the lens to such an extent that the covering of the rear add-on tube with respect to the tube of the lens is reversed and then releases a joint, about which the baffle plate can be swung.

The construction required for this is relatively expensive.

SUMMARY OF THE INVENTION

The principal object of the present invention is to provide a baffle plate for a movie or TV camera with which a swinging away of the baffle plate, for instance for exchanging the lens of the movie or TV camera, is clearly simplified. The construction of this baffle plate is to be likewise simplified as compared with the prior art.

This object is achieved, according to the invention, by providing an add-on tube with a swivel arm, having a swivelling axis which is fixed with respect to the camera lens and which is located in parallel to the rear plane of the add-on tube and in or behind this plane and is positioned such that the distance to the opposite rear inner edge of the add-on tube, which is slipped onto the camera lens, is approximately equal to or larger than the distance to the front outer edge of the camera lens. The clearance between the add-on tube and the camera lens is preferably in the range from 0.5 mm to 1 mm.

Accordingly, the add-on tube of the baffle plate is provided with a swivel arm which has a swivelling axis which is fixed with respect to the camera lens and which is located in parallel to the rear plane of the add-on tube and in it or behind it. Moreover, the swivelling axis is positioned in such a way that the distance to the opposite rear inner edge of the add-on tube which is slipped onto the camera lens with a clearance is approximately equal to or larger than the distance to the front outer edge of the camera lens.

Thus, it is superfluous according to the invention to at first axially displace the baffle plate and to then swing it away. According to the invention a simple swinging away is sufficient, if the swivel arm of the add-on tube of the baffle plate and the position of the swivelling axis are correspondingly positioned.

Thus, the previous construction with a displacement of the baffle plate and a subsequent swinging is clearly simplified. Moreover, the weight of the baffle plate is reduced and the handling is facilitated.

Then, the clearance between the add-on tube of the baffle plate and the tube of the camera lens is approximately 0.75 mm in conventional movie and TV cameras. Moreover, the immersion depth of the tube of the camera lens into the add-on tube of the baffle plate is approximately 14 mm. Of course, these dimensions are only a clue. The distance of the swivelling axis behind the rear plane of the add-on tube may e.g. only be staggered towards the rear by two millimeters for conventional movie or TV cameras. The minimum distance of the swivelling axis to the central axis of the lens is 40.5 millimeters for a lens diameter of 80 mm.

Irrespective of the diameter of the camera lens the dimensions of the swingable baffle plate according to the invention are not larger than those of the devices used so far for a linear displacement and a subsequent swinging away of the baffle plate. Obviously, so far nobody thought of the surprisingly simple solution according to the invention.

For a full understanding of the present invention, reference should now be made to the following detailed description of the preferred embodiment of the invention as illustrated in the accompanying drawing.

BRIEF DESCRIPTION OF THE DRAWING

The single FIGURE is a side view of a camera lens with the add-on tube according to the invention.

DESCRIPTION OF THE PREFERRED EMBODIMENT

Figure 1:
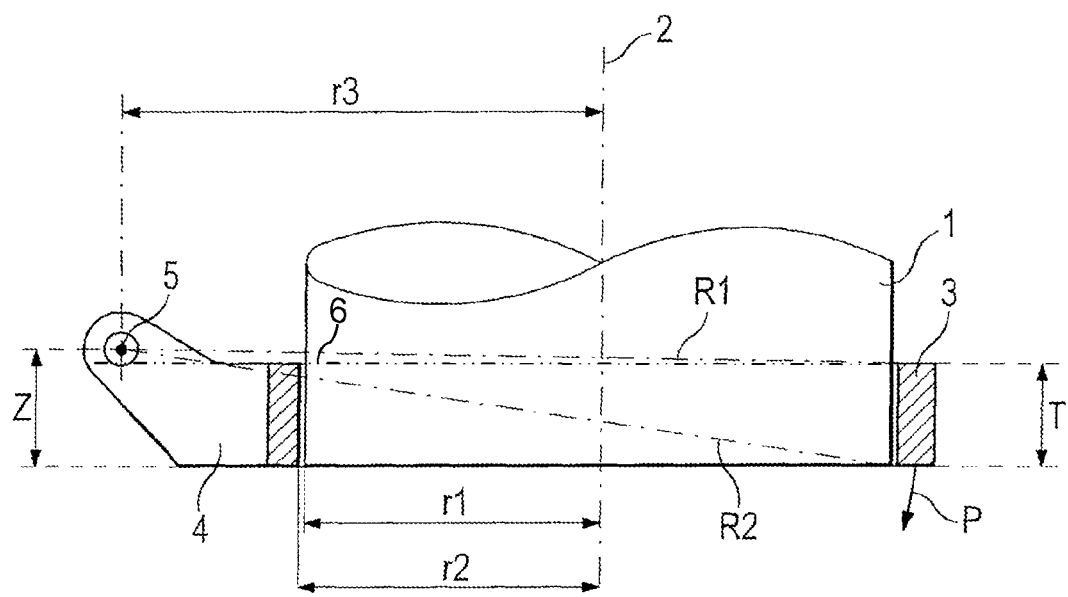

A lens and/or a lens tube surrounding this lens of a movie and TV camera (not shown) is designated with 1 in the FIGURE. This lens whose lens axis is designated with 2 has a radius r1 of e.g. 40 mm so that the diameter of the lens tube 1 is 80 mm. The lens 1 is enclosed by a ring 3, said add-on tube, with little clearance, the radius r2 of this ring being e.g. by 0.75 mm larger than that of the lens 1. The ring 3 whose front side coincides with the front side of the lens 1 has a depth and/or thickness T.

Typical figures for standard lenses of movie or TV cameras are 40 mm for the radius r1, 40.75 mm for the radius r2 and 14 mm for the thickness T of the ring 3.

The ring 3 is part of a baffle plate (not shown here) with flaps, blades, louvres or the like, which block out the disturbing stray light.

The ring 3 has a swivel arm 4 which is bent towards the back in the direction towards the camera, which can be swung about a swivelling axis 5, which is fixed with respect to the camera lens 1 and which is located in parallel to the plane of the ring 3 (e.g., a rear plane 6) and behind it or in it, namely at a distance Z from the front plane of the camera lens 1 and/or the ring, which is equal to or slightly larger than the thickness T of the ring. A typical value for the distance Z is e.g. 16 mm, i.e. this distance is by about 2 mm larger than the thickness T of the ring. The distance of the center of the swivelling axis 5 from the lens axis 2 is designated with r3 in the FIGURE. Typical values for this distance r3 range from 40.5 mm to 66.5 mm for camera lenses with a diameter of 80 mm. It is of no importance for the swivel arm 4 in which vertical height it is affixed to the ring 3.

The ring 3 can be swung about the swivelling axis 5 without displacement, if the distance R1 between the center of the swivelling axis 5 and the opposite rear inner edge of the ring 3 is larger than or equal to the distance R2 between the center of the swivelling axis 5 and the opposite front outer edge of the camera lens 1.

If e.g. the camera lens which is accommodated in the lens tube 1 is to be exchanged, the ring 3 with the further allocated elements of the baffle plate can be simply swung towards the outside in the direction of the arrow P, whereupon the lens can be exchanged. Subsequently, the ring 3 is again swung back into the represented operating position.

It is of course not imperative that the swivel arm 4 is bent as shown in the FIGURE; only the exact position of the swivelling axis 5 is of importance.

There has thus been shown and described a novel baffle plate for a movie or TV camera which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An add-on arrangement for a lens of a movie or TV camera, wherein the add-on arrangement comprises:
    an add-on tube which can be slipped onto the lens with a clearance such that the lens extends into the add-on tube, wherein the add-on tube has a rear edge which is substantially within a rear plane; and
    a swivel arm which is fixed in place on the add-on tube, wherein the swivel arm rotates about a swiveling axis which is fixed with respect to the lens, wherein the swiveling axis is oriented parallel to the rear plane,
    wherein the swiveling axis is positioned such that a first distance between the swiveling axis and an opposite rear inner edge of the add-on tube is greater than or equal to a second distance between the swiveling axis and a front outer edge of the lens.

2. The add-on arrangement according to claim 1, wherein the clearance between the add-on tube and the lens is between 0.5 mm and 1 mm.

3. The add-on arrangement according to claim 1, wherein an immersion depth of the lens into the add-on tube ranges from 0 mm to 20 mm.

4. The add-on arrangement according to claim 1, wherein a third distance between the swiveling axis and a front plane of the lens is between 0 mm to 2 mm greater than an immersion depth of the lens into the add-on tube.

* * * * *